(12) United States Patent
Lim et al.

(10) Patent No.: US 8,184,942 B2
(45) Date of Patent: May 22, 2012

(54) DIGITAL BROADCAST RECORDER AND METHOD FOR RECORDING TITLE USING THE SAME

(75) Inventors: Pung Hwan Lim, Yongin-si (KR); Cheon Seong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1243 days.

(21) Appl. No.: 11/397,738

(22) Filed: Apr. 5, 2006

(65) Prior Publication Data
US 2006/0251390 A1    Nov. 9, 2006

(30) Foreign Application Priority Data

May 3, 2005  (KR) .................. 10-2005-0037193

(51) Int. Cl.
*H04N 5/765* (2006.01)
*H04N 9/80* (2006.01)
*H04N 5/76* (2006.01)
*H04N 5/84* (2006.01)

(52) U.S. Cl. ......... 386/234; 386/248; 386/297; 386/335
(58) Field of Classification Search .............. 386/83, 386/95, 87, 46
See application file for complete search history.

(56) References Cited

U.S. PATENT DOCUMENTS

| 5,479,628 | A | * | 12/1995 | Olson et al. ............ 711/206 |
| 5,488,409 | A | * | 1/1996 | Yuen et al. ............ 725/41 |
| 6,125,231 | A | | 9/2000 | Yuen et al. |
| 6,636,688 | B1 | * | 10/2003 | Otana ............ 386/83 |
| 7,206,498 | B2 | * | 4/2007 | Otana ............ 386/83 |
| 7,499,628 | B2 | * | 3/2009 | Yuen et al. ............ 386/248 |
| 7,663,700 | B2 | * | 2/2010 | Yuen et al. ............ 348/569 |
| 7,895,624 | B1 | * | 2/2011 | Thomas et al. ............ 725/44 |
| 8,087,048 | B2 | * | 12/2011 | Hassell et al. ............ 725/44 |
| 2002/0147782 | A1 | * | 10/2002 | Dimitrova et al. ............ 709/207 |
| 2002/0181935 | A1 | * | 12/2002 | Otana ............ 386/83 |
| 2003/0033502 | A1 | | 2/2003 | Matsuzaki |
| 2007/0180472 | A1 | * | 8/2007 | Denda et al. ............ 725/52 |
| 2009/0320063 | A1 | * | 12/2009 | Barrett ............ 725/34 |

FOREIGN PATENT DOCUMENTS
JP    2003-32662    1/2003

OTHER PUBLICATIONS

European Search Report issued Jul. 19, 2010 in EP Application No. 06251946.7.
Summons to Attend Oral Proceedings issued in European Patent Application No. 06251946.7 on Sep. 29, 2011.

* cited by examiner

*Primary Examiner* — Helen Shibru
(74) *Attorney, Agent, or Firm* — Stanzione & Kim, LLP

(57) ABSTRACT

A title record method to be used with a digital broadcast recorder including recording a received digital broadcast signal, and, substantially simultaneously, reading broadcast information contained in the digital broadcast signal, determining the presence or absence of a program title in the broadcast information, continuously reading the broadcast information of the next digital broadcast signal following the digital broadcast signal if no title is present in the broadcast information, and, substantially simultaneously, determining the presence or absence of the title in the next digital broadcast signal, and recording the title as a title of the recorded broadcast signal if the title is present in the broadcast information.

17 Claims, 3 Drawing Sheets

DIGITAL BROADCAST RECORDER AND METHOD FOR RECORDING TITLE USING THE SAME

CROSS-REFERENCE TO RELATED APPLICATION

This application claims the benefit of Korean Application No. 2005-37193, filed May 3, 2005, in the Korean Intellectual Property Office, the disclosure of which is incorporated herein by reference.

BACKGROUND OF THE INVENTION

1. Field of the Invention

An aspect of the present invention relates to a digital broadcast recorder and a method of recording a title using the same, and, more particularly, to a digital broadcast recorder and a method of recording a title using the same, which automatically detect a title of a broadcast program contained in a digital broadcast signal during the recording time of the digital broadcast signal, and record the detected title as a title of the recorded broadcast program.

2. Description of the Related Art

Recently, digital broadcast technology has been rapidly developed in many countries throughout the world. The digital broadcast is indicative of a broadcast scheme for compressing a television (TV) signal into a digital signal, and transmitting the compressed digital signal to a plurality of TV viewers. A conventional analog TV broadcast loads only one video or image signal in a single broadcast signal, and transmits a voice or audio signal via another broadcast signal. However, the digital broadcast loads a plurality of video signals or a plurality of audio signals in such a single broadcast signal, does not suffer a deterioration of signal quality even though the video and audio signals are compressed, and establishes a plurality of channels in a frequency band of a single channel.

The digital broadcast provides a digital broadcast receiver to receive a digital broadcast signal (e.g., a digital TV, a set-top box, and a Personal Video Recorder (PVR), etc.) with an Electronic Program Guide (EPG) service to display program schedules of individual channels. Therefore, the above-mentioned digital broadcast receiver extracts schedule information from the received digital broadcast signal, and displays the extracted schedule information for a user. If the user selects a desired channel, the digital broadcast receiver is tuned to the selected channel.

The above-mentioned EPG service is executed using meta data which is contained in the digital broadcast signal and which is then transmitted. The meta data for use in the digital broadcast allows both a simple service such as a channel tuning service and a variety of high-quality services to be available. For example, the meta data controls detailed program information (e.g., a synopsis, an actor or actress, and a program review, etc.) to be displayed for a user, and may automatically establish a reserved recording of overall series of a specific season.

The meta data is also used for a digital broadcast record operation. A conventional digital broadcast recorder detects a program title from the aforementioned meta data when recording the digital broadcast signal, and stores the detected program title as a title of the recorded broadcast program. As may be seen from Japanese Patent Laid-open No. 2003-32662, a hard-disc recorder acting as one type of digital broadcast recorder detects a title of a corresponding program from meta data contained in a digital broadcast signal, and records the detected title as a title of the recorded program.

However, if the above-mentioned conventional digital broadcast recorder initially records either an advertising broadcast signal having no title or a distorted digital broadcast signal caused by a poor broadcast environment, the digital broadcast recorder erroneously determines that there is no title in the advertising broadcast signal or the distorted broadcast signal, such that the digital broadcast recorder erroneously records a title of a recorded broadcast program as "No Title." In this case, a user must directly enter a desired title after the recording operation is finished, resulting in inconvenience to the user.

Most users prefer to set a recording start time to a specific time prior to a broadcast start time of a desired broadcast program to be recorded, such that the number of occurrences of the above-mentioned problem is increased during the recording of the digital broadcast signal or program.

SUMMARY OF THE INVENTION

Therefore, an aspect of the invention provides a digital broadcast recorder and a method of recording a title using the same, which detect a title from the next digital broadcast signal following a received digital broadcast signal even though the title is not initially detected from the received digital broadcast signal, and which record the detected title as a title of a recorded broadcast program.

Additional and/or other aspects and advantages of the invention will be set forth in part in the description which follows and, in part, will be obvious from the description, or may be learned by practice of the invention.

In accordance with an aspect of the invention, the above and/or other aspects may be achieved by the provision of a title record method to be used with a digital broadcast recorder comprising: recording a received digital broadcast signal, and, substantially simultaneously, reading broadcast information contained in the digital broadcast signal; determining the presence or absence of a program title in the broadcast information; continuously reading the broadcast information of the next digital broadcast signal following the digital broadcast signal if no title is present in the broadcast information, and, substantially simultaneously, determining the presence or absence of the title in the next digital broadcast signal; and recording the title as a title of the recorded broadcast signal if the title is present in the broadcast information.

In an embodiment of the invention, the broadcast information is indicative of meta data.

In an embodiment of the invention, the method further comprises: temporarily storing the title in the digital broadcast recorder if the title is present in the broadcast information; and storing the title in a storage medium contained in the digital broadcast recorder if the recording of the digital broadcast signal is terminated.

In an embodiment of the invention, the method further comprises: continuously reading broadcast information of the next digital broadcast signal during a predetermined time if no title is present in the broadcast information.

In an embodiment of the invention, the method further comprises: recording the title of the recorded broadcast signal as "No Title" information if the digital broadcast signal in which the broadcast information including the title is contained is not received before the predetermined time elapses.

In an embodiment of the invention, the predetermined time ranges from an initial reception time of the digital broadcast signal to a record end time of the digital broadcast signal.

In an embodiment of the invention, the digital broadcast recorder includes a Blu-ray Disc (BD) recorder.

In accordance with another aspect of the present invention, there is provided a digital broadcast recorder comprising: a digital tuner to receive a digital broadcast signal; a recorder to record the digital broadcast signal in a storage medium; a broadcast information reader to read broadcast information contained in the digital broadcast signal; and a controller to determine the presence or absence of a program title in the broadcast information, to continuously search for the title from broadcast information contained in the next digital broadcast signal following the digital broadcast signal when the absence of the program title is determined, and to record the searched title as a title of a recorded broadcast signal.

In an embodiment of the invention, the broadcast information is indicative of meta data.

In an embodiment of the invention, the digital broadcast recorder includes a Blu-ray Disc (BD) recorder.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
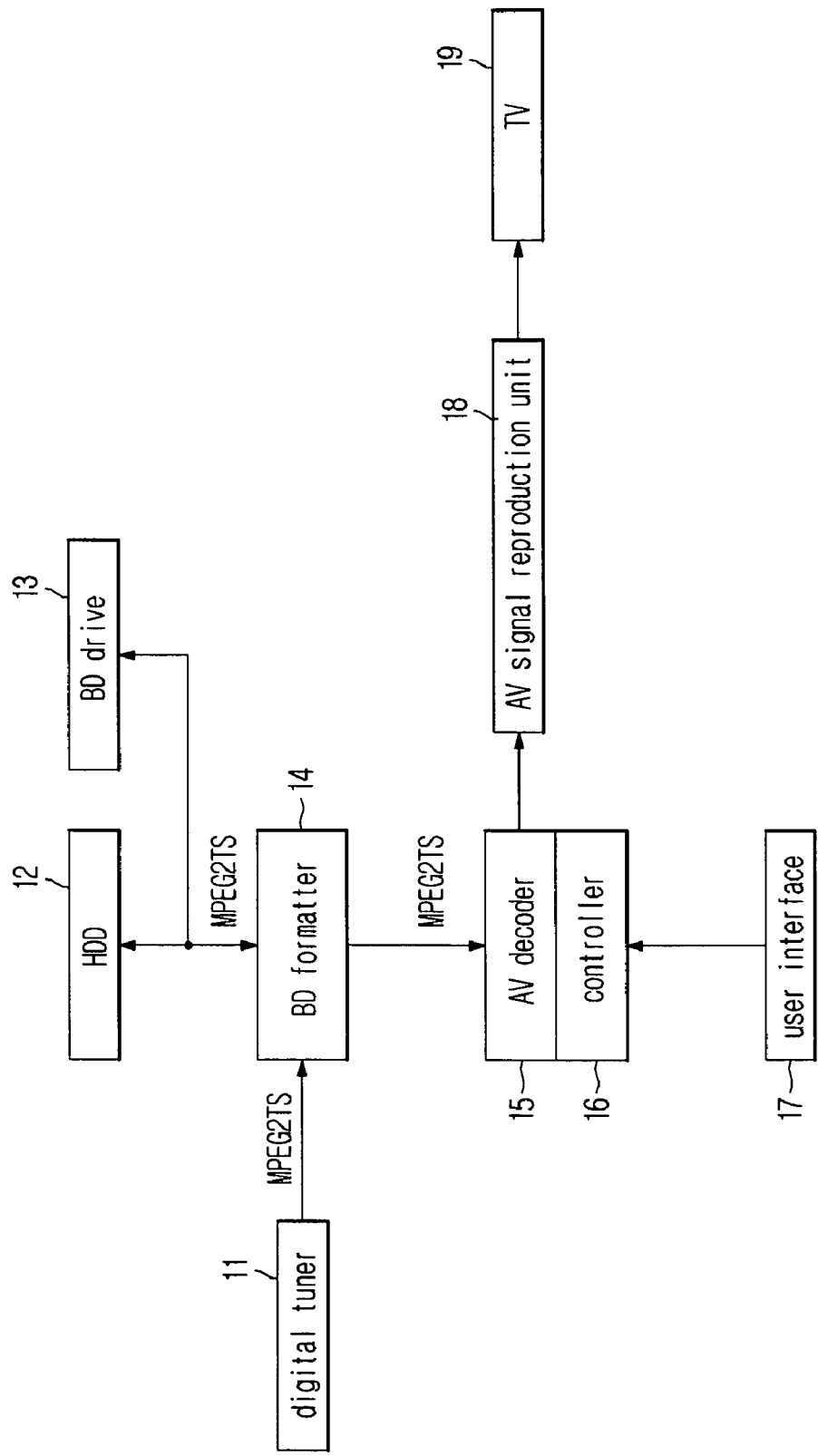
FIG. 1 is a block diagram illustrating a Blu-ray Disc (BD) recorder acting as a digital broadcast recorder according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As shown in FIG. 1, a Blu-ray Disc (BD) recorder acting as a digital broadcast recorder according to an embodiment of the present invention includes a digital tuner 11, a BD formatter 14, a Hard Disc Drive (HDD) 12, a BD drive 13, an audio/visual (AV) decoder 15, a controller 16, an AV signal reproduction unit 18, and a user interface 17.

The digital tuner 11 receives a digital broadcast signal, such as an Advanced Television System Committee (ATSC), of a user-desired channel, and converts the received digital broadcast signal into a Moving Picture Experts Group 2 (MPEG2) transport stream. The BD formatter 14 converts the MPEG2 transport stream into a predetermined standard signal capable of being easily stored in a BD, or loads an additional signal (e.g., an encryption prevention signal, etc.) in the MPEG2 transport stream. The BD drive 13 receives a BD, and stores the MPEG2 transport stream received from the BD formatter 14 in the BD.

Figure 2:
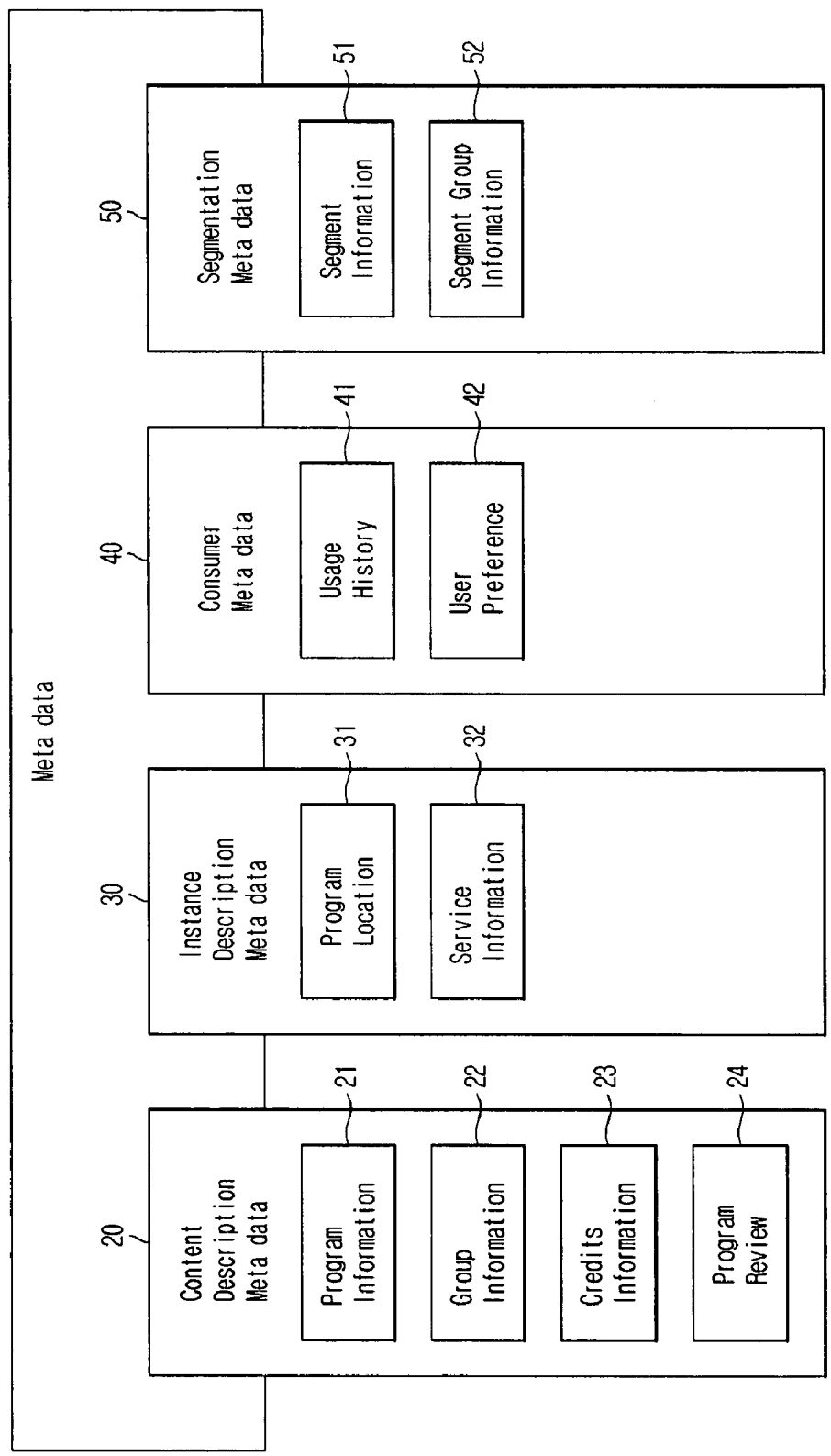
FIG. 2 is a structural diagram illustrating meta data loaded in a digital broadcast signal according to an embodiment of the present invention.

The AV decoder 15 decompresses the MPEG2 transport stream received from the BD formatter 14, converts the decompressed MPEG2 transport stream into a video signal (e.g., a composite signal, and a component signal, etc.) and an audio signal, and reads meta data contained in the MPEG2 transport stream. As shown in FIG. 2, the meta data includes content description meta data 20 that is indicative of broadcast content information, instance description meta data 30 that is indicative of broadcast schedule information, consumer meta data 40 that is indicative of content data associated with a consumer or user; and segmentation meta data 50 that is indicative of interval information of the broadcast content data.

The content description meta data 20 includes program information, group information 22, credit information 23, and program review information 24. The program information 21 represents detailed information associated with a program, for example, a title, a synopsis, a genre, a language, and a cast of the program. The group information 22 represents information for grouping a plurality of programs according to group types (e.g., a series, a show, and a program concept, etc.). The credit information 23 represents various credit information associated with a program, for example, director, actor or actress, producer, writer, and cast information of the program. The program review information 24 represents a critical opinion associated with the program.

The instance description meta data 30 includes program location information 31 and service information 32. The program location information 31 represents time and medium information of the broadcast program. The service information 32 represents broadcast station information, for example, name, URL, logo, main service genre, and ID information of the broadcast station. In this case, the instance is classified into a schedule event for use in a real-time broadcast service and an on-demand event for use in an on-demand broadcast service. The schedule event divides time information into a broadcast start time, a broadcast end time, and a broadcast duration time, and uses a broadcast station channel as a medium. The on-demand event does not determine the broadcast start time and the broadcast end time independently of each other, and may use not only the broadcast station channel but also an Internet address as such a medium.

The consumer meta data 40 includes a usage history 41 and a user preference 42. The usage history 41 is indicative of an action history indicative of a consumption type of broadcast contents of the user. The user preference 42 is indicative of preference information associated with broadcast contents of the user.

The segmentation meta data 50 includes segment information 51 and segment group information 52. The segment information 51 includes a program ID associated with a segment, a segment title, and a segment synopsis, etc. The segment group information 52 is indicative of a segment group to group segments according to a single concept.

The controller 16 receives meta data from the AV (Audio/Video) decoder 15, detects a program title from the program information 21 contained in the content description meta data 20, and stores the detected program title in a temporary register (not shown) of a BD recorder. After the recording of the broadcast program is completed, the controller 16 determines the temporarily-stored title to be a title of the recorded broadcast program, and records the determined title in the HDD 12 or the BD.

The AV signal reproduction unit 18 receives video and audio signals from the AV decoder 15, and converts the video and audio signals into specific signals capable of being displayed on a display such as a TV 19. For example, if the display displays a National Television System Committee (NTSC) TV signal, the AV signal reproduction unit 18 converts the video signal received from the AV decoder 16 into a specific signal suitable for the NTSC standard, and transmits the converted result to the TV 19. However, if the display is a digital TV, the video and audio signals received from the AV decoder 15 are directly transmitted to the digital TV without having to pass through the AV signal reproduction unit 18.

Figure 3:
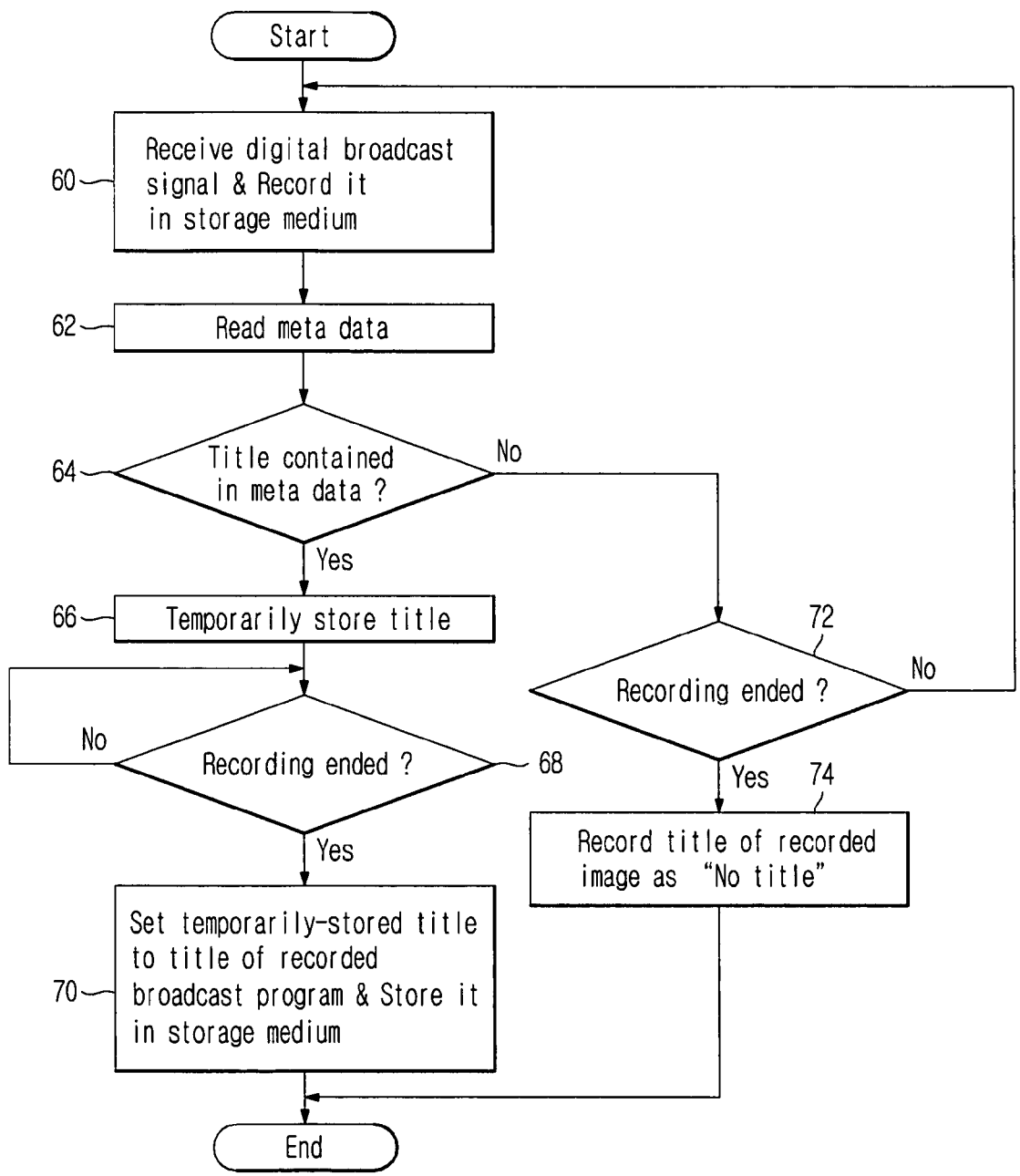
FIG. 3 is a flow chart illustrating a method of controlling the BD recorder to detect a title from a digital broadcast signal, and of recording the detected title in a storage medium contained in the BD recorder according to the present invention.

A method of recording a title using a BD recorder acting as a digital broadcast recorder according to an embodiment of the present invention will hereinafter be described with reference to FIG. 3. Referring to FIG. 3, if a user selects a desired channel using the user interface 17, and enters a record command associated with the selected channel, the digital tuner 11 receives a digital broadcast signal of the user-selected channel, and converts the received digital broadcast signal into an MPEG2 transport stream at operation 60. The MPEG2 transport stream is converted into a specific signal format capable of being stored in the BD or the HDD 12, such that converted result is stored in the BD or the HDD 12.

The MPEG2 transport stream is also transmitted to the AV decoder 15. The AV decoder 15 reads meta data contained in the MPEG2 transport stream at operation 62. The controller 16 determines whether a title of a program currently stored in the BD or the HDD 12 is present in the meta data received from the AV decoder 15 at operation 64.

If no program title is present in the meta data loaded in the digital broadcast signal currently received/recorded at operation 64, the controller 16 determines whether the recording of the digital broadcast signal is terminated at operation 72. For example, if it is determined that no program title is present in the meta data, this indicates that a received broadcast program has no title (e.g., an advertising broadcast signal) or unexpected distortion occurs in a digital broadcast signal having a unique title due to a poor broadcasting state.

If the recording of the digital broadcast signal is not terminated at operation 72, the operation process returns to operation 60. Otherwise, if the recording of the digital broadcast signal is terminated at operation 72, the controller 16 determines a title of a recorded image to be "No Title" at operation 74, and stores the "No Title" information in the BD or the HDD 12. According to an aspect of the present invention, if the title of the program is not detected from a received digital broadcast signal, the program title is detected from the next digital broadcast signal following the received digital broadcast signal until reaching a recording end time of the program. However, it should be noted that aspects of the present invention may search for the program title from the digital broadcast signal during only a predetermined time. For example, the content "Recording ended?" of the above operation 72 may be replaced with other content, such as "Predetermined time elapsed?" as is necessary. As a result, if the program title is not detected from the digital broadcast signal during the predetermined time, the operation process continues to operation 74.

Thus, although the program title is not detected from a current digital broadcast signal, the present invention continuously detects the program title from the next digital broadcast signal following the current digital broadcast signal until reaching the recording end time of the program. Therefore, although an advertising broadcast signal or an unstable broadcast signal may be received when the recording of the broadcast signal begins, the user may still detect a title of a desired program to be recorded.

However, if the program title is detected at operation 64, the controller 16 temporarily stores the detected title in a temporary register at operation 66, and determines whether the recording of the broadcast program is terminated at operation 68. If the recording of the broadcast program is not terminated at operation 68, the controller 16 continuously enters a standby mode. If the recording of the broadcast program is terminated at operation 68, the controller 16 determines the temporarily-stored title to be a title of the recorded broadcast program, and stores the determined title in the BD or the HDD 12 at operation 70.

Although an aspect of the present invention uses the BD recorder as the digital broadcast recorder, it should be noted that the present invention may also be applied to not only the BD recorder but also other digital broadcast recorders (e.g., a set-top box including the HDD).

As is apparent from the above description, a digital broadcast recorder and a method of recording a program title using the same according to an aspect of the present invention may continuously detect a title from the next digital broadcast signal following an initial digital broadcast signal even though the program title is not initially detected due to either the reception of an advertising broadcast signal or the distortion of the digital broadcast signal when starting the recording of the digital broadcast signal, such that the detected title is recorded as a title of the recorded broadcast signal.

As a result, an aspect of the present invention does not determine the title of the recorded broadcast signal to be "No Title" generated when no title is detected, such that the user need not directly enter a title of the recorded broadcast signal.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A title record method to be used with a digital broadcast recorder, comprising:
    recording a received digital broadcast signal, and, substantially simultaneously, reading broadcast information contained in the digital broadcast signal;
    determining the presence or absence of any program title information in the broadcast information;
    continuously reading the broadcast information of the next digital broadcast signal following the digital broadcast signal if no program title information is present in the broadcast information, and, substantially simultaneously, determining the presence or absence of the program title information in the next digital broadcast signal; and
    recording the program title as a title of the recorded broadcast signal which is recorded before the program title information is detected if the program title information is present in the broadcast information and the recording of the digital broadcast signal has been terminated.

2. The method according to claim 1, wherein the broadcast information is indicative of meta data.

3. The method according to claim 1, further comprising:
    temporarily storing the title in the digital broadcast recorder if the program title information is present in the broadcast information; and
    storing the title in a storage medium contained in the digital broadcast recorder if the recording of the digital broadcast signal is terminated.

4. The method according to claim 1, further comprising:
    continuously reading broadcast information of the next digital broadcast signal during a predetermined time if no program title information is present in the broadcast information.

5. The method according to claim 4, further comprising:
    recording the title of the recorded broadcast signal as "No Title" information if the digital broadcast signal in which the broadcast information including the program title information is contained is not received before the predetermined time elapses.

6. The method according to claim 4, wherein the predetermined time ranges from an initial reception time of the digital broadcast signal to a record end time of the digital broadcast signal.

7. The method according to claim 1, wherein the digital broadcast recorder includes a Blu-ray Disc recorder.

8. A digital broadcast recorder, comprising:
   a digital tuner to receive a digital broadcast signal;
   a recorder to record the digital broadcast signal in a storage medium;
   a broadcast information reader to read broadcast information contained in the digital broadcast signal; and
   a controller to determine the presence or absence of any program title information in the broadcast information, to continuously search for the program title information from broadcast information contained in the next digital broadcast signal following the digital broadcast signal when the absence of the program title information is determined, and to record the searched program title as a title of the recorded broadcast signal which is recorded before the program title information is searched when the recording of the digital broadcast signal is terminated.

9. The digital broadcast recorder according to claim 8, wherein the broadcast information is indicative of meta data.

10. The digital broadcast recorder according to claim 8, wherein the digital broadcast recorder includes a Blu-ray Disc recorder.

11. The digital broadcast recorder according to claim 8, further comprising:
   a Hard Disk Drive (HDD) in which the title is stored.

12. A recording method to be used with a digital broadcast recorder, comprising:
   recording a received digital broadcast signal, and, substantially simultaneously, reading broadcast information contained in the digital broadcast signal;
   determining the presence or absence of a particular predetermined characteristic related to the digital broadcast signal in the broadcast information, wherein the absence of the particular predetermined characteristic does not include a mismatch of the particular predetermined characteristic;
   continuously reading the broadcast information of the next digital broadcast signal following the digital broadcast signal if the particular predetermined characteristic is not present in the broadcast information, and, substantially simultaneously, determining the presence or absence of the particular predetermined characteristic in the next digital broadcast signal; and
   recording the particular predetermined characteristic as the particular predetermined characteristic if the particular predetermined characteristic is present in the broadcast information and the recording of the digital broadcast signal has been terminated.

13. A digital broadcast recorder, comprising:
   a digital tuner to receive a digital broadcast signal;
   a recorder to record the digital broadcast signal in a storage medium;
   a broadcast information reader to read broadcast information contained in the digital broadcast signal; and
   a controller to determine the presence or absence of a particular predetermined characteristic in the broadcast information, wherein the absence of the particular predetermined characteristic does not include a mismatch of the particular predetermined characteristic, to continuously search for the particular predetermined characteristic from broadcast information contained in the next digital broadcast signal following the digital broadcast signal when the absence of the particular predetermined characteristic is determined, and to record the searched particular predetermined characteristic as the particular predetermined characteristic of a recorded broadcast signal when the recording of the digital broadcast signal is terminated.

14. The method according to claim 1, wherein
   the digital broadcast signal and the next broadcast signal occur within a time period of a single broadcast program.

15. The method according to claim 1, wherein
   the broadcast signal with no title present is at least one of an advertising broadcast signal and an unstable broadcast signal.

16. The method according to claim 1, wherein the absence of the program title information is not a mismatched program title.

17. The method according to claim 1, wherein the broadcast information further comprises:
   group information to represent information for grouping a plurality of programs according to group types;
   credit information to represent various credit information associated with a program; and
   program review information to represent a critical opinion associated with the program.

* * * * *